(12) United States Patent  
Steinberger et al.

(10) Patent No.: US 9,140,346 B2
(45) Date of Patent: Sep. 22, 2015

(54) ONE-WAY TURBINE WEDGE CLUTCH

(71) Applicant: Schaeffler Technologies AG & Co. KG, Herzogenaurach (DE)

(72) Inventors: Markus Steinberger, Macedonia, OH (US); Jacob Rufener, Rittman, OH (US)

(73) Assignee: Schaeffler Technologies AG & Co. KG, Herzogenaurach ( * ) Notice: Subject to any disclaimer, the term of this patent is extended or adjusted under 35 U.S.C. 154(b) by 65 days.

(21) Appl. No.: 13/937,480

(22) Filed: Jul. 9, 2013

(65) Prior Publication Data

US 2014/0251744 A1 Sep. 11, 2014

Related U.S. Application Data

(60) Provisional application No. 61/775,152, filed on Mar. 8, 2013.

(51) Int. Cl.
*F16H 45/00* (2006.01)
*F16H 45/02* (2006.01)
*F16H 41/24* (2006.01)

(52) U.S. Cl.
CPC ............... *F16H 45/00* (2013.01); *F16H 45/02* (2013.01); *F16H 2041/246* (2013.01); *F16H 2045/021* (2013.01); *F16H 2045/0221* (2013.01); *F16H 2045/0284* (2013.01)

(58) Field of Classification Search
CPC .................. F16H 2045/005; F16H 2045/0221
USPC ........................................................ 192/3.25
See application file for complete search history.

(56) References Cited

U.S. PATENT DOCUMENTS

| 2,785,782 | A | | 3/1957 | Dodge | |
|---|---|---|---|---|---|
| 4,018,106 | A | * | 4/1977 | Uozumi et al. | 475/56 |
| 4,919,009 | A | | 4/1990 | Newman et al. | |
| 7,703,590 | B2 | | 4/2010 | Heck et al. | |
| 7,987,958 | B2 | | 8/2011 | Hemphill et al. | |
| 8,020,681 | B2 | | 9/2011 | Davis | |
| 2004/0098982 | A1 | * | 5/2004 | Becke et al. | 60/330 |
| 2014/0014454 | A1 | * | 1/2014 | Davis | 192/45.1 |
| 2014/0014455 | A1 | * | 1/2014 | Davis | 192/45.1 |

* cited by examiner

*Primary Examiner* — Rodney H Bonck
(74) *Attorney, Agent, or Firm* — Simpson & Simpson, PLLC

(57) ABSTRACT

A torque converter, including: a cover; a pump shell non-rotatably connected to the cover; a turbine shell; and a one-way clutch including: an outer race non-rotatably connected to the turbine shell and including a groove; an output hub including a first outer surface with first ramps; and at least one wedge plate including a second inner surface with second ramps engaged with the first ramps and a second outer surface disposed within the groove. For rotation of the outer race with respect to the output hub in a first direction, the outer race is rotatable with respect to the at least one wedge plate and the output hub. For rotation of the outer race with respect to the hub in a second direction, opposite the first direction, the at least one wedge plate is arranged to non-rotatably connect the outer race and the hub.

17 Claims, 6 Drawing Sheets

ONE-WAY TURBINE WEDGE CLUTCH

CROSS-REFERENCE TO RELATED APPLICATIONS

This application claims the benefit under 35 U.S.C. §119 (e) of U.S. Provisional Patent Application No. 61/775,152, filed Mar. 8, 2013, which application is incorporated herein by reference in its entirety.

TECHNICAL FIELD

The present disclosure relates to a one-way turbine clutch, in particular, a one-way turbine wedge clutch requiring minimal axial space.

BACKGROUND

Drag in a coast condition for a hybrid vehicle, for example, caused by the turbine in a torque converter, reduces electric motor efficiency for hybrid vehicles, since the drag creates a reverse torque and reduces the effective torque of the electric motor. Roller and rocker one-way clutches between the torque converter and the electric motor are difficult to package at the turbine due to large axial space requirement. Sprag one-way clutches require precise radial centering to insure performance and durability, increasing fabrication complexity and cost.

SUMMARY

According to aspects illustrated herein, there is provided a torque converter, including: a cover; a pump shell non-rotatably connected to the cover; a turbine including a turbine shell; and a one-way clutch. The one-way clutch includes: an outer race non-rotatably connected to the turbine shell and including a first inner circumferential surface with a circumferentially continuous groove; an output hub arranged to non-rotatably engage an input shaft for a transmission, and including a first outer circumferential surface with a first plurality of ramps; and at least one wedge plate including a second inner circumferential surface with a second plurality of ramps engaged with the first plurality of ramps and a second outer circumferential surface at least partially disposed within the groove. For relative rotation of the outer race with respect to the output hub in a first rotational direction, the outer race is rotatable with respect to the at least one wedge plate and the output hub. For relative rotation of the outer race with respect to the output hub in a second rotational direction, opposite the first rotational direction, the at least one wedge plate is arranged to non-rotatably connect the outer race and the output hub.

According to aspects illustrated herein, there is provided a torque converter, including: a cover; a pump shell non-rotatably connected to the cover; a turbine including a turbine shell; and a one-way clutch. The one-way clutch includes: an output hub arranged to non-rotatably engage an input shaft for a transmission, and including a first outer circumferential surface with a first plurality of ramps; an outer race non-rotatably connected to the turbine shell and including a first inner circumferential surface with a radially inwardly opening groove with first and second surfaces tapering toward each other radially outward; a first wedge plate including a second inner circumferential surface with a second plurality of ramps engaged with the first plurality of ramps and a second outer circumferential surface in contact with the first surface; a second wedge plate axially aligned with the first wedge plate and including a third inner circumferential surface with a third plurality of ramps engaged with the first plurality of ramps and a third outer circumferential surface in contact with the second surface; a bushing non-rotatably engaged with the outer hub; and a centering plate non-rotatably connected with the outer race, at least partially radially aligned with the bushing, and in contact with the bushing. For relative rotation of the outer race with respect to the output hub in a first rotational direction, the outer race is rotatable with respect to the first and second wedge plates and the output hub. For relative rotation of the outer race with respect to the output hub in a second rotational direction, opposite the first rotational direction, the first and second wedge plates are arranged to non-rotatably connect the outer race and the output hub. The bushing and the centering plate center the turbine with respect to the output hub.

According to aspects illustrated herein, there is provided a torque converter, including: a cover; a pump shell non-rotatably connected to the cover; a turbine including a turbine shell; and a one-way clutch. The one-way clutch including: an output hub arranged to non-rotatably engage an input shaft for a transmission, and including a first outer circumferential surface with a first plurality of ramps; an outer race non-rotatably connected to the turbine shell and including a first inner circumferential surface with a radially inwardly opening groove with first and second surfaces tapering toward each other radially outward; a first wedge plate including a second inner circumferential surface with a second plurality of ramps engaged with the first plurality of ramps and a second outer circumferential surface in contact with the first surface; a second wedge plate axially aligned with the first wedge plate and including a third inner circumferential surface with a third plurality of ramps engaged with the first plurality of ramps and a third outer circumferential surface in contact with the second surface, and a centering plate non-rotatably connected with the outer race and including a radially innermost portion in contact with the output hub. For relative rotation of the outer race with respect to the output hub in a first rotational direction, the outer race is rotatable with respect to the first and second wedge plates and the output hub. For relative rotation of the outer race with respect to the output hub in a second rotational direction, opposite the first rotational direction, the first and second wedge plates are arranged to non-rotatably connect the outer race and the output hub. The centering plate centers the turbine with respect to the output hub.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1A:
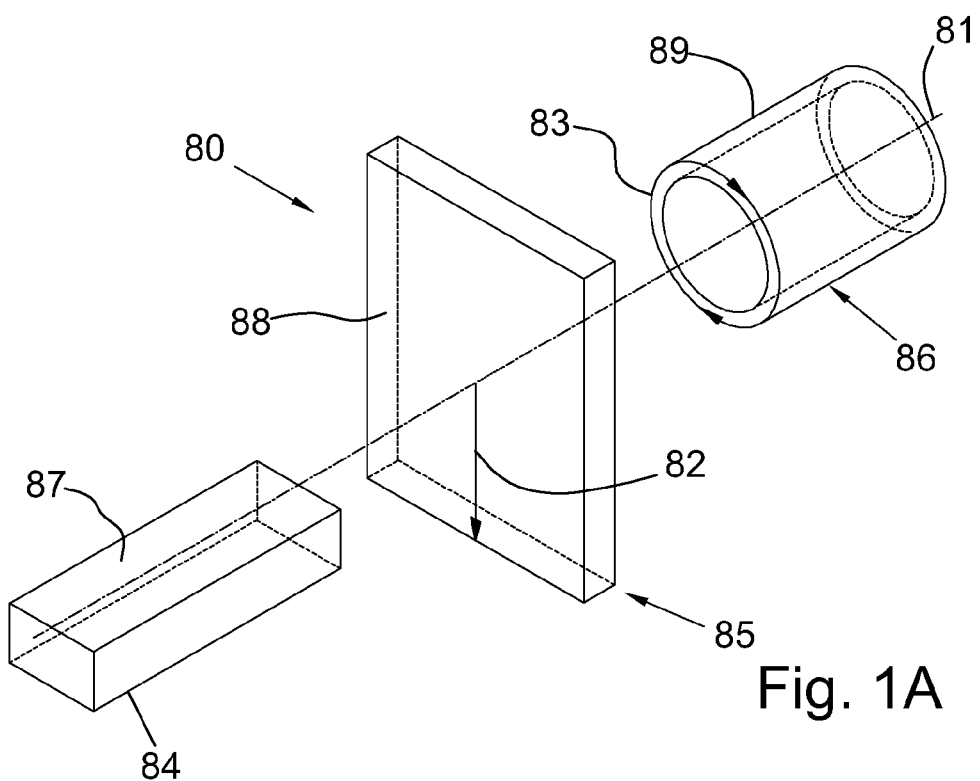
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
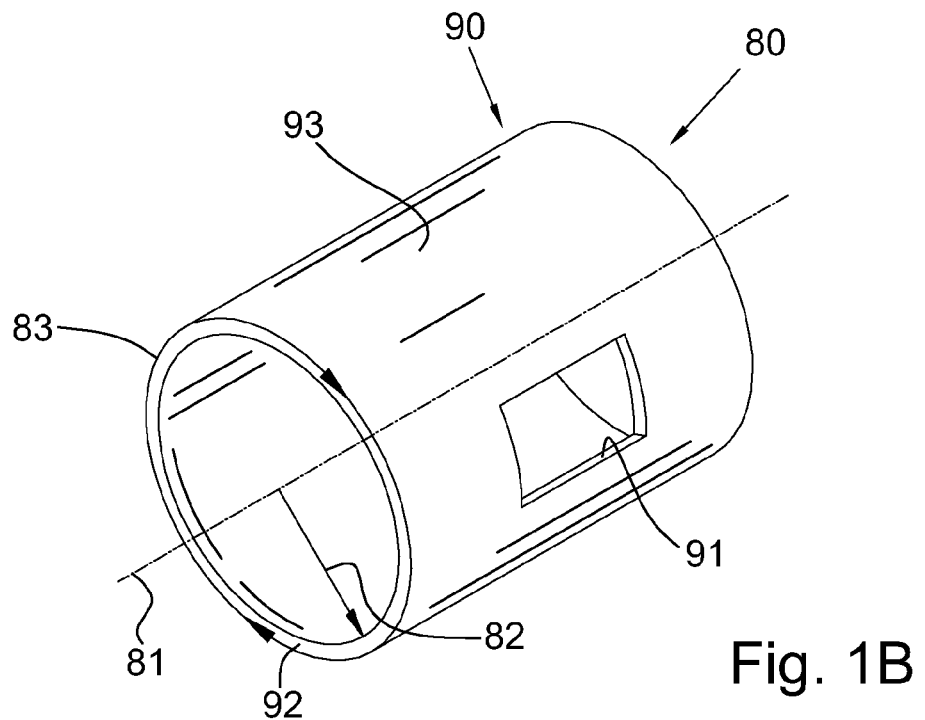
FIG. 1B is a perspective view of an object in the cylindrical coordinate system of FIG. 1A demonstrating spatial terminology used in the present application; and, FIG. 2 is a partial cross-sectional view of a torque converter with a turbine wedge one-way clutch.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

Figure 2:
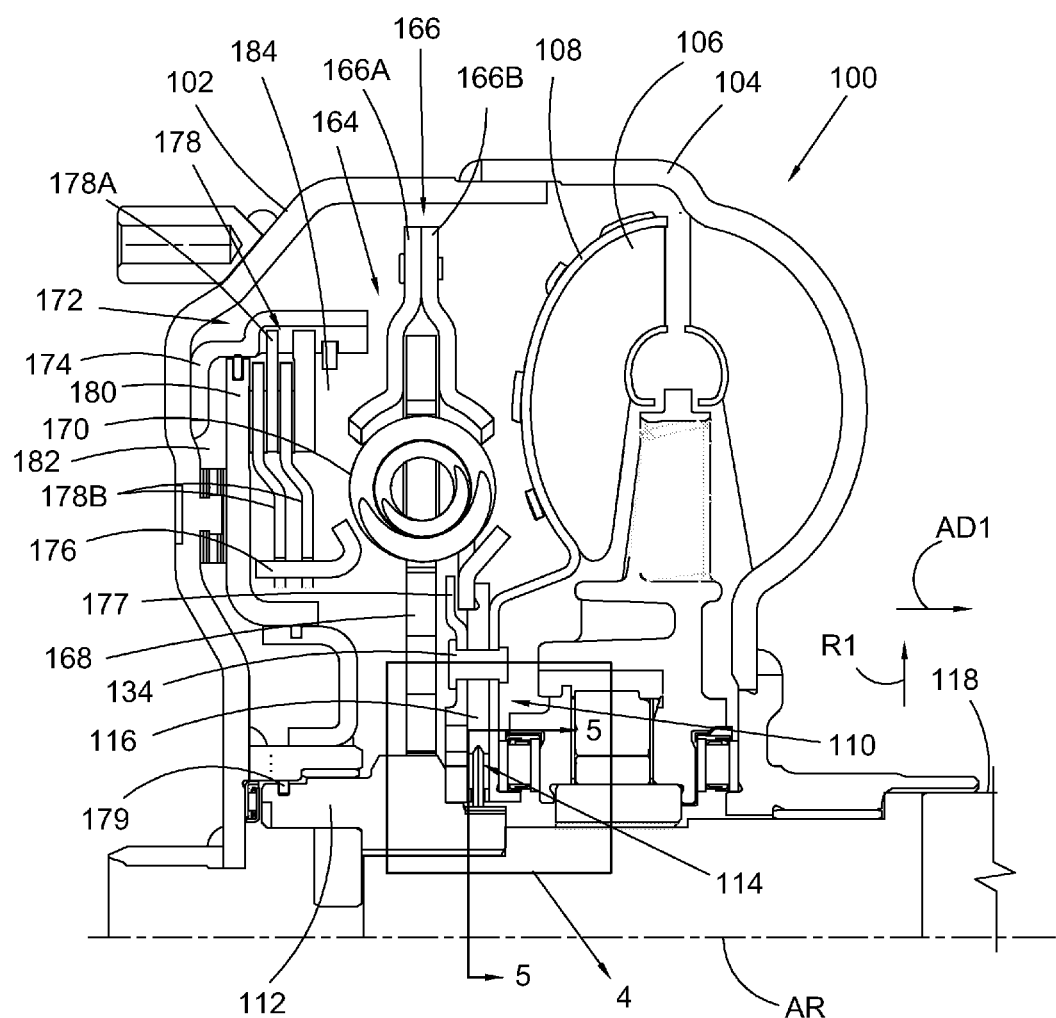

FIG. 2 is a partial cross-sectional view of a torque converter with a turbine wedge one-way clutch.

Figure 3:
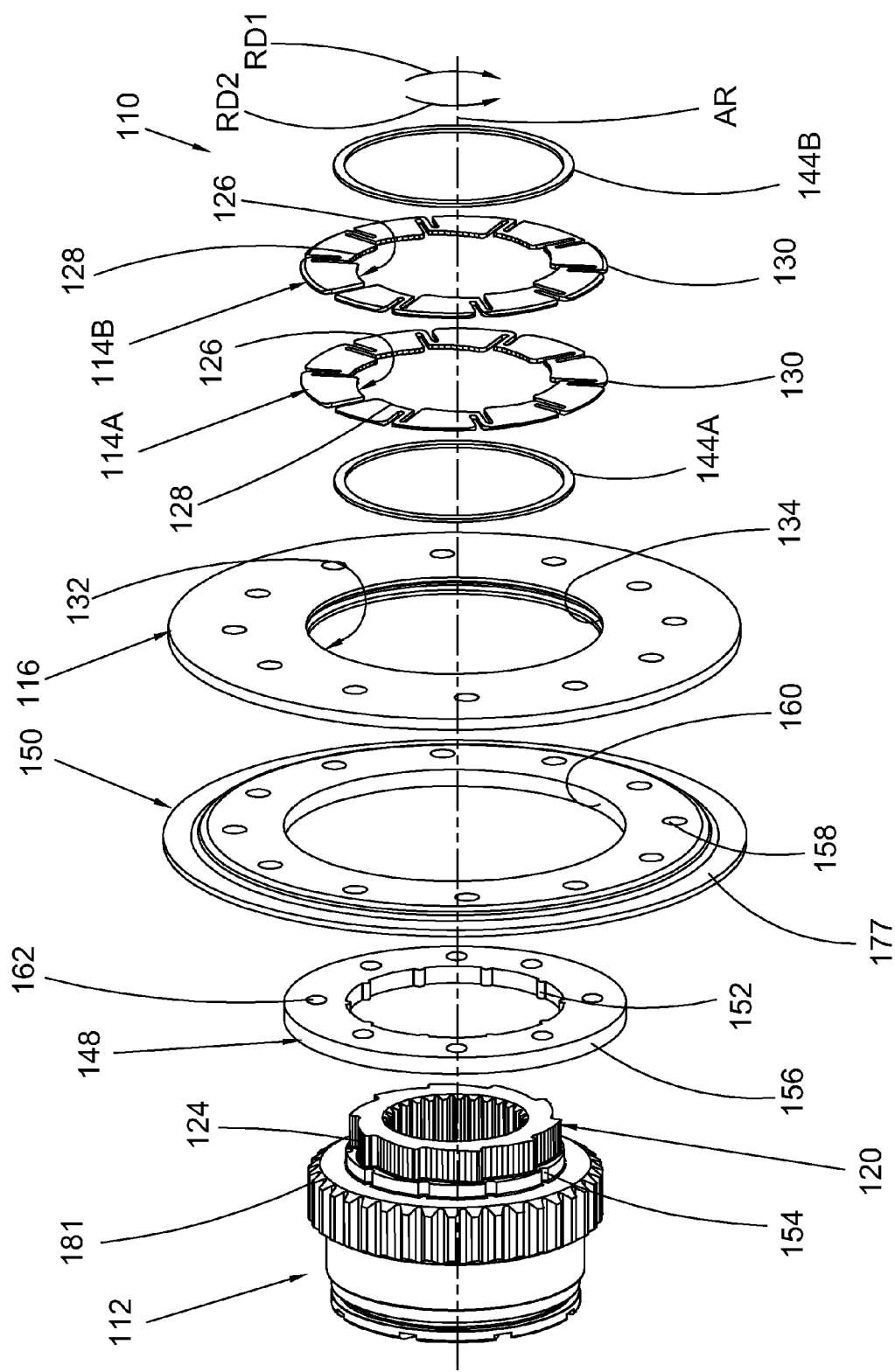
FIG. 3 is an exploded view of the one-way clutch of FIG. 2.

FIG. 3 is an exploded view of the one-way clutch of FIG. 2.

Figure 4:
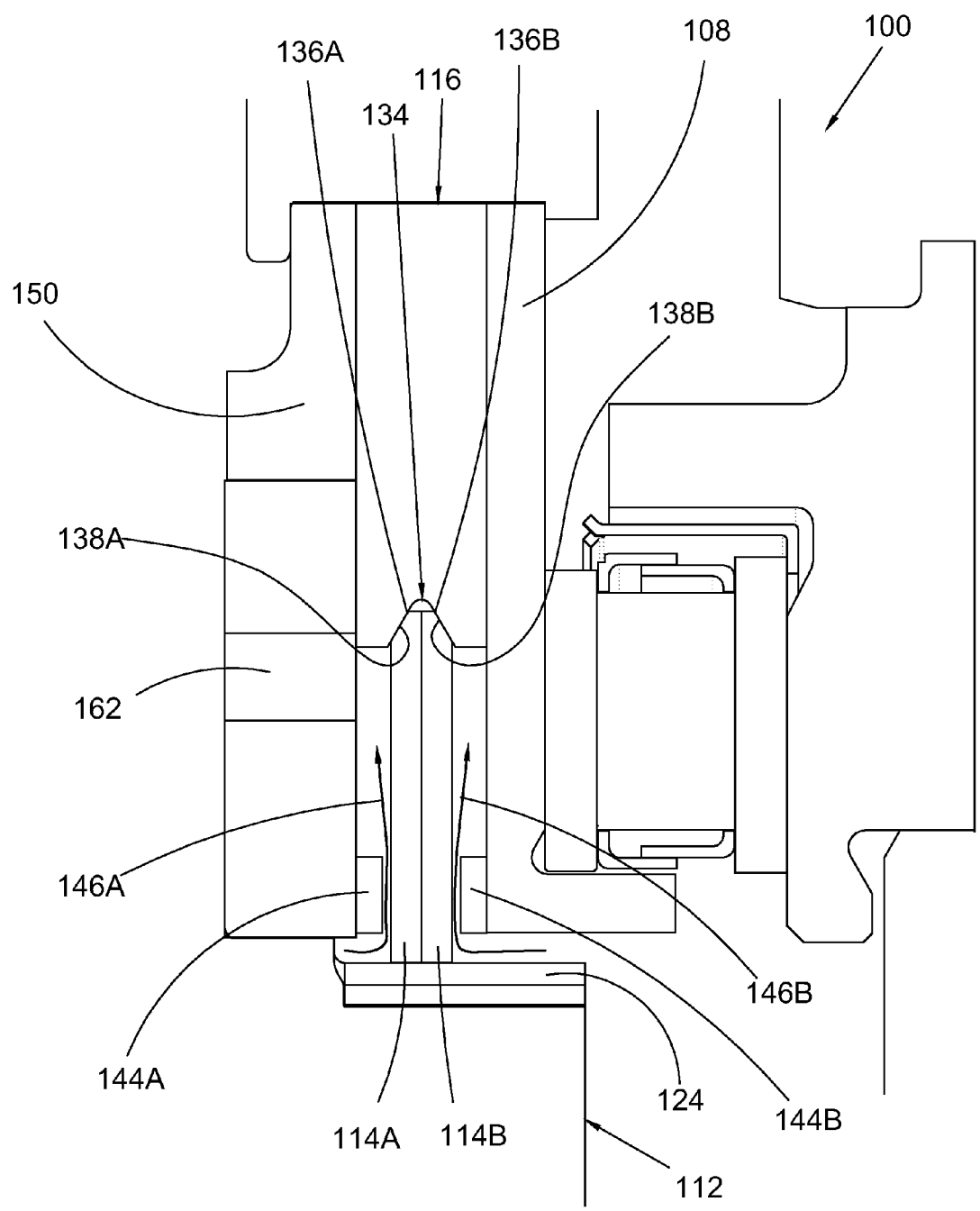
FIG. 4 is a detail of area 4 in FIG. 2.

FIG. 4 is a detail of area 4 in FIG. 2.

Figure 5:
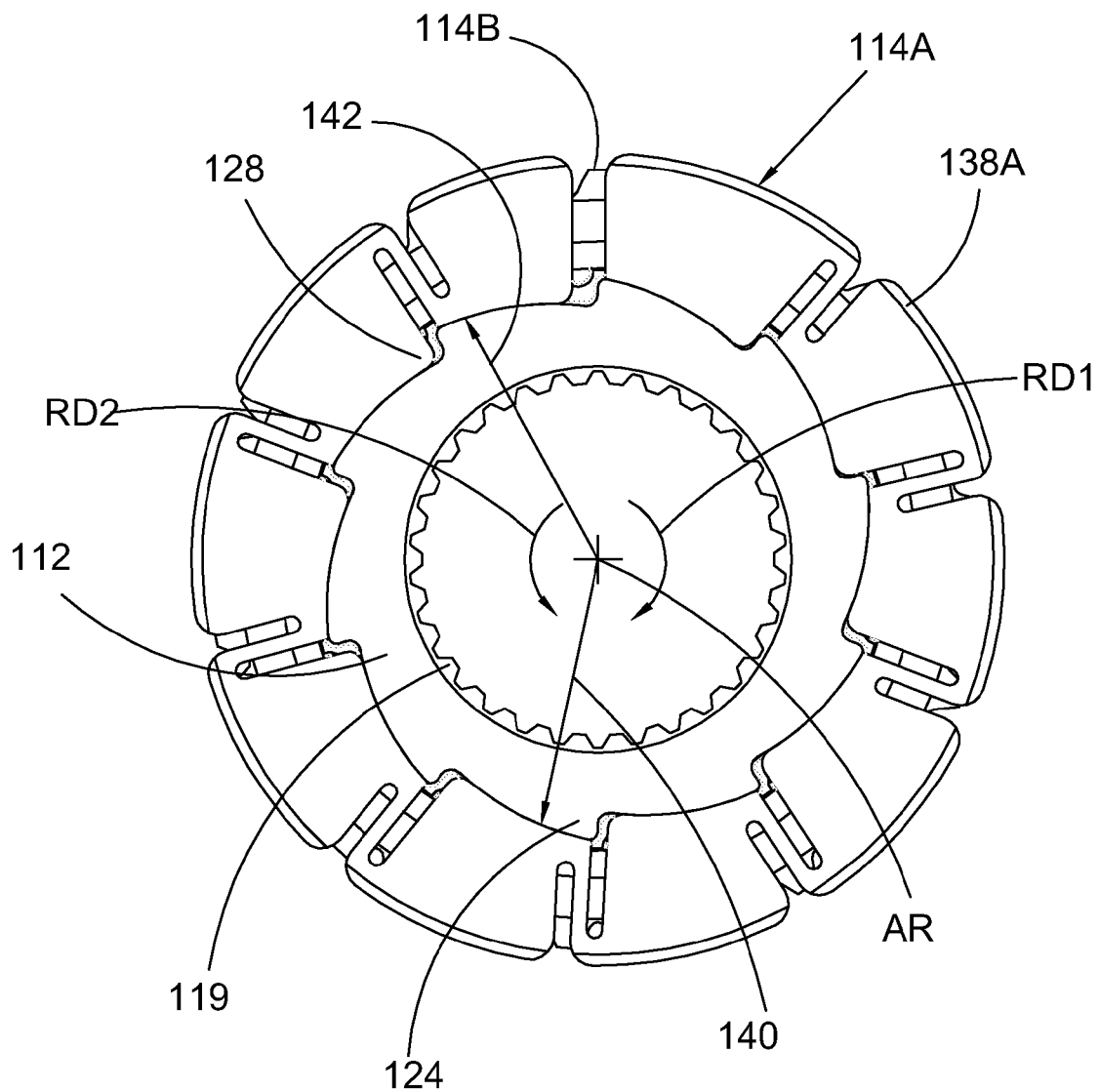
FIG. 5 is a full cross-sectional view generally along line 5-5 in FIG. 2.

FIG. 5 is a full cross-sectional view generally along line 5-5 in FIG. 2. The following should be viewed in light of FIGS. 2 through 5. Torque converter 100 includes cover 102, pump shell 104 non-rotatably connected to cover 102, turbine 106 including turbine shell 108, and one-way turbine wedge clutch 110. Clutch 110 includes output hub 112, at least one wedge plate 114, and outer race 116. Output hub 112 is arranged to non-rotatably engage transmission input shaft 118, for example via splines 119, and includes outer circumferential surface 120 with ramps 124. Wedge plate(s) 114 include inner circumferential surface 126 with ramps 128 engaged with ramps 124, and outer circumferential surface 130. The outer race is non-rotatably connected to turbine shell 108 and includes inner circumferential surface 132 engaged with outer circumferential surface 130. Turbine shell 108 and outer race 116 can be connected by any means known in the art, for example by at least one rivet 134. Output hub 112 is arranged to radially center torque converter 100 with respect to input shaft 118.

For relative rotation of outer race 116 with respect to output hub 112 in rotational direction RD1, outer race 116 is rotatable with respect to wedge plate(s) 114 and output hub 112 (free-wheel mode). For relative rotation of outer race 116 with respect to output hub 112 in rotational direction RD2, opposite the rotational direction RD1, wedge plate(s) 114 is arranged to non-rotatably connect outer race 116 and output hub 112 (locking mode). Thus, a torque path from turbine 106 to input shaft 120 via clutch 110 is formed.

In an example embodiment, outer race 116 includes groove 134 in inner circumferential surface 132. Groove 134 includes surfaces 136A and 136B tapering toward each other in radially outward direction R1. Outer circumferential surface 130 includes surfaces 138A and 138B, tapering toward each other in direction R1, and in contact surfaces 136A and 136B, respectively.

Radial extent 140 of each ramps 124 increases in direction RD2 and radial extent 142 of each ramps 128 increases in direction RD1. For the relative rotation of outer race 116 with respect to output hub 112 in direction RD1, ramps 128 slide along (down) ramps 124 in direction RD1 so that a radially outward force exerted by wedge plate(s) 114 on outer race 116 decreases. As a result, outer race 116 and output hub 112 are independently rotatable. By "independently rotatable" we mean that outer race 116 and output hub 112 are rotatable without restraint with respect to each other, for example, outer race 116 and output hub 112 are rotatable by more than 360 degrees with respect to each other. For the relative rotation of outer race 116 with respect to output hub 112 in direction RD2, ramps 128 slide along ramps 124 in direction RD2 so that output hub 112 displaces wedge plate(s) 114 radially outward to non-rotatably connect outer race 116 and output hub 112.

Frictional force between outer race 116 and wedge plate(s) 114 is greater than frictional force between wedge plate(s) 114 and output hub 112. Therefore, rotation of outer race 116 causes wedge plate(s) 114 to rotate with outer race 116 and causes ramps 128 to rotate (slide along) with respect to ramps 124 as described above.

In an example embodiment, wedge plate(s) 114 includes wedge plate 114A and wedge plate 114B axially aligned with wedge plate 114A. Wedge plate 114A includes surface 138A in contact with surface 136A and wedge plate 114B includes surface 138B in contact with surface 136B. Clutch 110 includes shim 144A axially disposed between output hub 112 and wedge plate 114A. Clutch 110 includes shim 144B axially disposed between output hub 112 and turbine shell 108. When outer race 116 is rotatable with respect to wedge plate(s) 114 and output hub 112 (free-wheel mode) flow path 146A, for fluid in the torque converter, is present between shim 144A and wedge plate 114A, and flow path 146B, for the fluid in the torque converter, is present between wedge plate 114B and shim 144B.

In an example embodiment, clutch 110 includes bushing 148 and centering plate 150. The bushing is non-rotatably connected to the output hub 112, for example, by protrusions 152 and indents 154 and includes outer circumferential surface 156. The centering plate is non-rotatably connected turbine shell 108, for example by rivet(s) 134 passing through holes 158 and includes inner circumferential surface 160 engaged with circumferential surface 156. Bushing 148 and centering plate 150 are rotatable with respect to each other and are arranged to center the turbine with respect to output hub 112, and subsequently with respect to shaft 118. Bushing 148 includes holes 162 through which the fluid in the torque converter can pass for cooling purposes.

Shim 144A is engaged with bushing 148. In the free-wheel mode, shim 144A is in contact with bushing 148 and wedge plate 114A to prevent buckling of plate 114A due to radial force exerted by the locking of output hub 112 and outer race 116. In the free-wheel mode, shim 144B is in contact with wedge plate 114B and turbine shell 108, also to prevent buckling of plate 114B due to the radial force.

In an example embodiment, torque converter 100 includes torsional vibration damper 164 including input element 166; output flange 168 non-rotatably connected to output hub 112; and at least one spring 170 engaged with input element 166 and output flange 168. Input element 166 is in contact with outer race 116 and rotatable with respect to outer race 116. In an example embodiment, element 166 includes cover plates 166A and 166B. Cover plate 166B is in contact with outer race 116, but is not rotatably connected to outer race 116. Therefore, outer race 116 is independently rotatable with respect to damper 164. In an example embodiment, torque converter 100 includes torque converter clutch 172 including input 174 non-rotatably connected to cover 102, and output 176 non-rotatably connected input element 166, for example, cover plate 166A. Portion 177 of plate 150 axially restrains cover plate 166B in combination with outer race 116.

Figure 6:
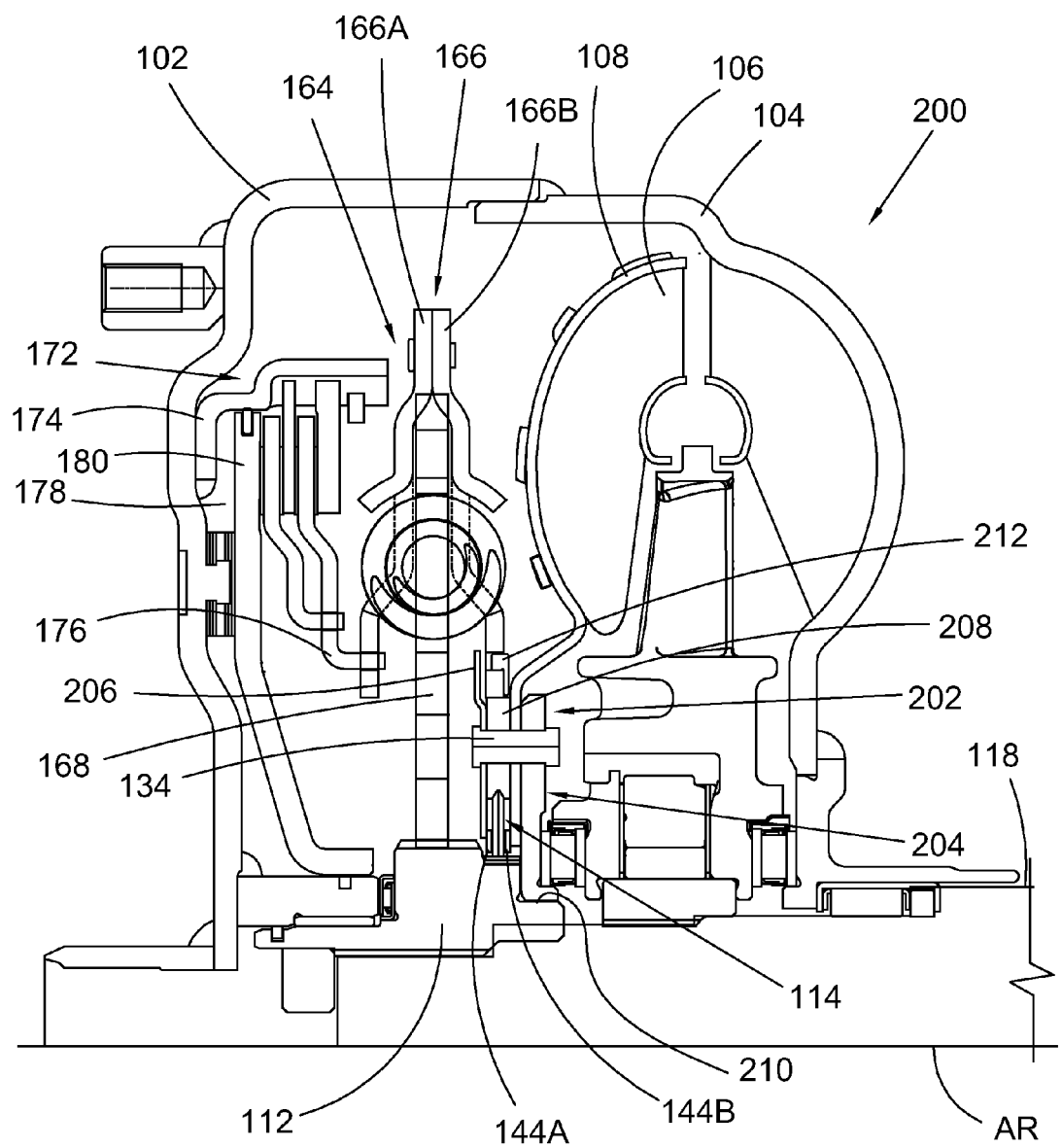
FIG. 6 is a partial cross-sectional view of a torque converter with a turbine wedge one-way clutch.

FIG. 6 is a partial cross-sectional view of torque converter 200 with one-way turbine wedge clutch 202. The discussion regarding FIGS. 2 through 5 is applicable to FIG. 6 except as noted. In clutch 202, bushing 148 and centering plate 150 are replaced by centering plate 204 and restraining plate 206 also, outer race 208 is modified. Centering plate 204 is non-rotatably connected to outer race 208 and turbine shell 108 and includes radially inner circumferential surface 210 in contact with output hub 112 to center turbine 106 with respect to input shaft 118. Plate 206 and turbine shell 108 axially restrain cover plate 166B. Cover plate 166B is in contact with outer race 208 but is independently rotatable with respect to outer race 208. Washer 212 is fixed to cover plate 166B and prevents contact between cover plate 166B and shell 108.

The following provides further detail regarding torque converters 100 and 200 and clutches 110 and 202. The discussion that follows is directed to torque converter 100 and clutch 110; however, it should be understood that the discussion is applicable to torque converter 200 and clutch 202 as well. Wedge loading groove 134 (surfaces 136A and 136B) interfaces with angled chamfer surfaces 138A and 138B of wedge plates 114A and 114B, respectively. Surfaces 136A and 136B and surfaces 138A and 138B have respective surface finishes that optimize torque transmission. That is, contact of surfaces 136A/138A and 136B/138B result in frictional forces that rotationally engage surfaces 136A/138A and 136B/138B such that outer race 116 and wedge plates 114A and 114B rotate together. The relative rotation of ramps 124 and 128 determine whether surfaces 138A and 138B of wedge plates 114A and 114B are locked into groove 134.

As noted above, output hub 112 centers torque converter 100 to input shaft 118, includes interface spline 119 to input shaft 118, and centers turbine 106 to input shaft through centering bushing 148 and centering plate 150 (this function is provided by centering plate 208 in converter 200). In addition, output hub 112 accommodates seal gland 179 to enable piston lockup for clutch 172, provides interface spline 181 to damper flange 168, and supports thrust loads from turbine 106.

Clutch 110 uses wedge geometry, ramps, and friction to implement the functionality described above. The geometry of outer race 116 and wedge plates 114A and 114B is designed such that a connection/frictional force for wedge plates 114A and 114B is always higher on outer race 116 than on output hub 112. This force enables the displacement of ramps 128 with respect to ramps 124 described above.

The size of shims 144A and 144B is large enough to prevent wedge plates 114A and 114B from buckling in the locking mode and small enough allow fluid flow and minimize drag in the free-wheel mode. Fluid flow past wedge plates 114A and 114B is critical to reduce heat build-up in and increase durability of clutch 110. As noted above, holes, such as holes 162, are used within components to maintain cooling flow.

During a coast condition for a vehicle housing torque converter 100, torque is transmitted through turbine 106 and turbine shell 108 the outer race 116 such that outer race 116 rotates in direction RD1 with respect to output hub 112 and clutch 110 is in free-wheel mode. The torque creates an interaction between surfaces 136A and 136B and surfaces 138A and 138B that causes ramps 128 to rotate down ramps 124 in direction RD1, reducing or eliminating radial force transmitted from output hub 112 to outer race 116 via wedge plates 114A and 114B. In the absence of the radial force, surfaces 136A and 136B rotate with respect to surfaces 138A and 138B enabling rotation of outer race 116 with respect to output hub 112.

During a drive condition for the vehicle housing torque converter 100, torque is transmitted through turbine 106 and turbine shell 108 to outer race 116 such that outer race 116 rotates in the direction RD2 with respect to output hub 112 and clutch 110 is in locking mode. The torque creates an interaction between surfaces 136A and 136B and surfaces 138A and 138B that causes ramps 128 to rotate up ramps 124 in direction RD2, which results in a radial force transmitted outward from output hub 112 through wedge plates 114A and 114B to outer race 116. The radial force locks wedge plates 114A and 114B to output hub 112 and into groove 134 to create a torque path from turbine 106 to shaft 118 via clutch 110.

Advantageously, clutches 110 and 172 can be operated independently of each other. For example, clutch 172 can be opened or closed independent of the mode (free-wheel or locking) of clutch 110. For example, clutch 172 includes at least one clutch plate 178 non-rotatably connected to input 174 or output 176 of torque converter clutch 172, for example plate 178A connected to input 174 and plates 178B connected to output 176. Clutch 172 also includes piston 180 and pressure chamber 182 at least partially bounded by piston 180 and cover 102. The piston is axially displaceable, for example in direction AD1, in response to fluid pressure in pressure chamber 182 and pressure chamber 184 to engage clutch plates 178 to non-rotatably connected input 174 and output 176. Respective fluid pressures in pressure chambers 182 and 184 are controlled independent of the relative rotation of outer race 116 with respect to output hub 112. Thus, operation of clutch 172 is independent of the mode (free-wheel or locking) of clutch 110.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A torque converter, comprising:
a cover;
a pump shell non-rotatably connected to the cover;
a turbine including a turbine shell; and,
a one-way clutch including:
  an outer race non-rotatably connected to the turbine shell and including a first inner circumferential surface with a circumferentially continuous groove;
  an output hub arranged to non-rotatably engage an input shaft for a transmission, and including a first outer circumferential surface with a first plurality of ramps; and,
  at least one wedge plate including:
    a second inner circumferential surface with a second plurality of ramps engaged with the first plurality of ramps; and,
    a second outer circumferential surface at least partially disposed within the groove, wherein:
for relative rotation of the outer race with respect to the output hub in a first rotational direction, the outer race is rotatable with respect to the at least one wedge plate and the output hub; and,
for relative rotation of the outer race with respect to the output hub in a second rotational direction, opposite the first rotational direction, the at least one wedge plate is arranged to non-rotatably connect the outer race and the output hub.

2. The torque converter of claim 1, wherein:
the groove includes first and second surfaces tapering toward each other in a radially outward direction;
the second outer circumferential surface of the at least one wedge plate includes third and fourth surfaces, tapering toward each other in the radially outward direction, in contact with the first and second surfaces, respectively.

3. The torque converter of claim 2, wherein:
a radially outward extent of each ramp in the first plurality of ramps increases in the second rotational direction and a radial inward extent of each ramp in the second plurality of ramps increases in the first rotational direction;
for the relative rotation of the outer race with respect to the output hub in the first rotational direction, the second plurality of ramps slides along the first plurality of ramps so that a radially outward force exerted by the at least one wedge plate on the outer race decreases; and,
for relative rotation of the outer race with respect to the output hub in the second rotational direction, the second plurality of ramps slides along the first plurality of ramps so that the output hub displaces the at least one wedge plate radially outward to non-rotatably connect the outer race and the output hub.

4. The torque converter of claim 2, wherein the at least one wedge plate includes:
a first wedge plate including the third surface; and,
a second wedge plate including the fourth surface, the torque converter further comprises:
  a first shim axially disposed between the output hub and the first wedge plate; and,
  a second shim axially disposed between the second wedge plate and the turbine shell, wherein:
when the outer race is rotatable with respect to the at least one wedge plate and the output hub:
  a first flow path, for fluid in the torque converter, is present between the first shim and the first wedge plate; and,
  a second flow path, for the fluid in the torque converter, is present between the second wedge plate and the second shim; and,
when the at least one wedge plate is non-rotatably connected to the outer race and the output hub:
  the first shim is in contact with the bushing and the first wedge plate; and,
  the second shim is in contact with the second wedge plate and the turbine shell.

5. The torque converter of claim 1, wherein:
for the relative rotation of the outer race with respect to the output hub in the first rotational direction, contact of the at least one wedge plate with the outer race rotates the second plurality of ramps in the first direction with respect to the first plurality of ramps; and,
for the relative rotation of the outer race with respect to the output hub in the second rotational direction, contact of the at least one wedge plate with the outer race rotates the second plurality of ramps in the second direction with respect to the first plurality of ramps.

6. The torque converter of claim 1, wherein a first frictional force between the outer race and the at least one wedge plate is greater than a second frictional force between the at least one wedge plate and the output hub such that rotation of the outer race causes the at least wedge plate to rotate with the outer race and the second plurality of ramps to rotate with respect to the first plurality of ramps.

7. The torque converter of claim 1, wherein the output hub is arranged to radially center the torque converter with respect to the input shaft.

8. The torque converter of claim 1, wherein the one-way clutch includes:
a centering plate non-rotatably connected to the turbine shell and including a third inner circumferential surface; and,
a bushing non-rotatably connected to the output hub and including a third outer circumferential surface engaged with the third inner circumferential surface, wherein:
the bushing and the centering plate rotatable with respect to each other and are arranged to center the turbine with respect to the input shaft.

9. The torque converter of claim 1, wherein the one-way clutch includes:
a centering plate non-rotatably connected to the outer race and the turbine shell and including a third inner circumferential surface in contact with the output hub to center the turbine with respect to the input shaft.

10. The torque converter of claim 1, further comprising:
a torsional vibration damper including:
  an input in contact with the outer race and rotatable with respect to the outer race;
  an output flange non-rotatably connected to the output hub; and,
  at least one spring engaged with the input element and the output flange.

11. The torque converter of claim 1, further comprising:
a torsional vibration damper including:
  an input in contact with the outer race and rotatable with respect to the outer race;
  an output flange non-rotatably connected to the output hub; and,
  at least one spring engaged with the input element and the output flange; and, a torque converter clutch including an input non-rotatably connected to the cover and an output non-rotatably connected to the input element.

12. The torque converter of claim 11, wherein:
opening and closing of the torque converter clutch is performable independent of operation of the one-way clutch.

13. The torque converter of claim 11, wherein:
the torque converter clutch includes:
- at least one clutch plate non-rotatably connected to one of the input or the output of the torque converter clutch;
- a piston; and,
- a pressure chamber at least partially formed by the cover and the piston;

the piston is axially displaceable in response to fluid pressure in the fluid chamber to engage the at least one clutch plate to non-rotatably connected the input and output of the torque converter clutch; and, pressure in the pressure chamber is controlled independent of the relative rotation of the outer race with respect to the output hub.

14. The torque converter of claim 1, wherein during a coast condition for a vehicle housing the torque converter, torque is transmitted through the turbine and turbine shell to the outer race such that the outer race rotates in the first rotational direction with respect to the output hub.

15. The torque converter of claim 1, wherein during a drive condition for a vehicle housing the torque converter, torque is transmitted through the turbine and turbine shell to the outer race such that the outer race rotates in the second rotational direction with respect to the output hub.

16. A torque converter, comprising:
a cover;
a pump shell non-rotatably connected to the cover;
a turbine including a turbine shell; and,
a one-way clutch including:
- an output hub arranged to non-rotatably engage an input shaft for a transmission, and including a first outer circumferential surface with a first plurality of ramps;
- an outer race non-rotatably connected to the turbine shell and including a first inner circumferential surface with a radially inwardly opening groove with first and second surfaces tapering toward each other radially outward;
- a first wedge plate including:
    - a second inner circumferential surface with a second plurality of ramps engaged with the first plurality of ramps; and,
    - a second outer circumferential surface in contact with the first surface;
- a second wedge plate axially aligned with the first wedge plate and including:
    - a third inner circumferential surface with a third plurality of ramps engaged with the first plurality of ramps; and,
    - a third outer circumferential surface in contact with the second surface;
- a bushing non-rotatably engaged with the outer hub; and,
- a centering plate non-rotatably connected with the outer race, at least partially radially aligned with the bushing, and in contact with the bushing, wherein:

for relative rotation of the outer race with respect to the output hub in a first rotational direction, the outer race is rotatable with respect to the first and second wedge plates and the output hub;

for relative rotation of the outer race with respect to the output hub in a second rotational direction, opposite the first rotational direction, the first and second wedge plates are arranged to non-rotatably connect the outer race and the output hub; and, the bushing and the centering plate center the turbine with respect to the output hub.

17. A torque converter, comprising:
a cover;
a pump shell non-rotatably connected to the cover;
a turbine including a turbine shell; and,
a one-way clutch including:
- an output hub arranged to non-rotatably engage an input shaft for a transmission, and including a first outer circumferential surface with a first plurality of ramps;
- an outer race non-rotatably connected to the turbine shell and including a first inner circumferential surface with a radially inwardly opening groove with first and second surfaces tapering toward each other radially outward;
- a first wedge plate including:
    - a second inner circumferential surface with a second plurality of ramps engaged with the first plurality of ramps; and,
    - a second outer circumferential surface in contact with the first surface;
- a second wedge plate axially aligned with the first wedge plate and including:
    - a third inner circumferential surface with a third plurality of ramps engaged with the first plurality of ramps; and,
    - a third outer circumferential surface in contact with the second surface; and,
- a centering plate non-rotatably connected with the outer race and including a radially innermost portion in contact with the output hub, wherein:

for relative rotation of the outer race with respect to the output hub in a first rotational direction, the outer race is rotatable with respect to the first and second wedge plates and the output hub;

for relative rotation of the outer race with respect to the output hub in a second rotational direction, opposite the first rotational direction, the first and second wedge plates are arranged to non-rotatably connect the outer race and the output hub; and, the centering plate centers the turbine with respect to the output hub.

\* \* \* \* \*